(12) United States Patent
Li et al.

(10) Patent No.: US 8,854,741 B2
(45) Date of Patent: Oct. 7, 2014

(54) ZOOM LENS ADJUSTMENT STRUCTURE

(71) Applicants: Premier Image Technology(China) Ltd., Foshan (CN); Hon Hai Precision Industry Co., Ltd., New Taipei (TW)

(72) Inventors: Jun-Jie Li, Foshan (CN); Zi-Yuan Li, Foshan (CN); Xiao-Tian Kang, Foshan (CN); Jian-Jun Zhang, Foshan (CN)

(73) Assignees: Premier Image Technology (China) Ltd., Foshan (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/790,405

(22) Filed: Mar. 8, 2013

(65) Prior Publication Data

US 2014/0063614 A1     Mar. 6, 2014

(30) Foreign Application Priority Data

Aug. 31, 2012  (CN) .......................... 2012 1 0317559

(51) Int. Cl.
*G02B 15/14* (2006.01)
*G02B 7/10* (2006.01)

(52) U.S. Cl.
CPC . *G02B 7/10* (2013.01); *G02B 7/102* (2013.01)
USPC .......................................................... 359/695

(58) Field of Classification Search
CPC ....................................................... G02B 7/102
USPC .......................................................... 359/695
See application file for complete search history.

(56) References Cited

U.S. PATENT DOCUMENTS

2009/0207509 A1*    8/2009   Nomura et al. ............... 359/813

\* cited by examiner

*Primary Examiner* — James Jones
(74) *Attorney, Agent, or Firm* — Novak Druce Connolly Bove + Quigg LLP

(57) ABSTRACT

A zoom lens adjustment structure includes a substrate, a focus device and a driving device. The focus device is mounted on the substrate, and includes a stationary lens barrel, a outside guide lens barrel, and a cam lens barrel. The outside guide lens barrel is received in the stationary lens barrel, the cam lens barrel is set at the inner side of the outside guide lens barrel, and plurality of active lens barrels are sandwiched between the outside guide lens barrel and the cam lens barrel. The active lens barrel includes a lens set. The driving device includes a motor and a gear group, which is positioned laterally to the stationary lens barrel, to drive the focus device adjusting the position of the active lens.

11 Claims, 5 Drawing Sheets

ZOOM LENS ADJUSTMENT STRUCTURE

BACKGROUND

1. Technical Field

The present disclosure relates to a zoom lens adjustment structure, and particularly to a zoom lens adjustment structure that allows for increase of a zoom ratio without increasing thickness of the zoom lens adjustment structure.

2. Description of Related Art

Image capturing devices (hereinafter cameras) are miniaturized for easy transport. Among such cameras, a zoom lens occupies a large portion of a camera in terms of volume, size, and weight. Generally, the zoom lens is composed of a number of lens barrels as part of a photographic optical system. The lens barrels move along an optical axis of the photographic optical system for zooming in and out. Increasing the zoom ratio without increasing thickness of the zoom lens, continues to need improvement.

Therefore, it is desirable to provide a zoom lens adjustment structure to overcome this shortcoming.

BRIEF DESCRIPTION OF THE DRAWINGS

Many aspects of the present ring flash module can be better understood with reference to the following drawings. The components in the drawings are not necessarily drawn to scale, the emphasis instead being placed upon clearly illustrating the principles of the present ring flash module. In the drawing, all the views are schematic.

DETAILED DESCRIPTION

Figure 1:
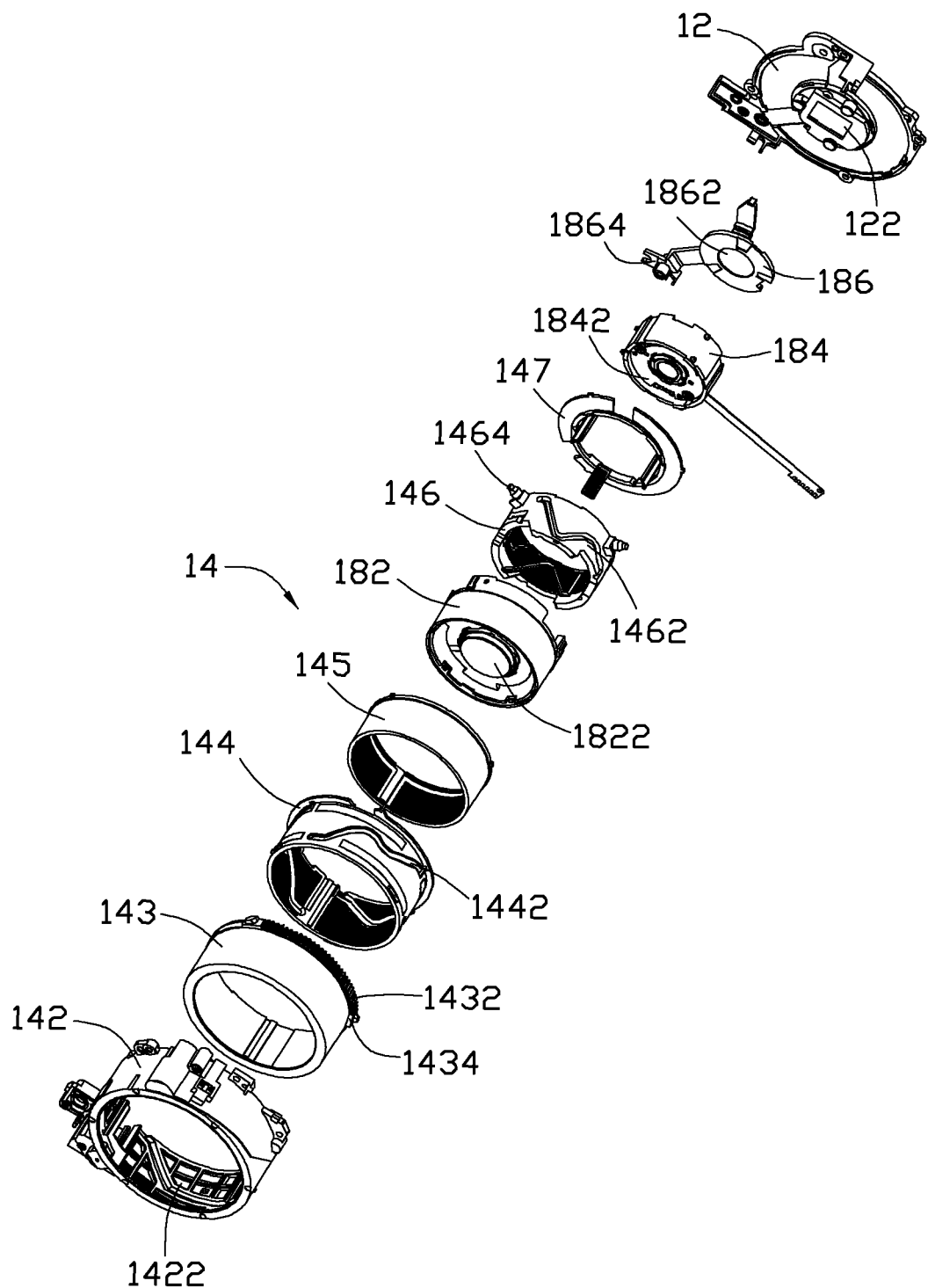
FIG. 1 is an exploded view of a zoom lens adjustment structure, in accordance with an exemplary embodiment.

FIG. 1 is an exploded view of a zoom lens adjustment structure 10, in accordance with an exemplary embodiment. The adjustment structure 10 includes a substrate 12, a focus device 14, and a driving device 16. The focus device 14 is mounted on the substrate 12, where the focus device 14 includes a stationary lens barrel 142, an outside guide lens barrel 144, and a cam lens barrel 146. The outside guide lens barrel 144 is received in the stationary lens barrel 142, while the cam lens barrel 146 is set at the inner side of the outside guide lens barrel 144, and plurality of active lens barrels 18 are sandwiched between the outside guide lens barrel 144 and the cam lens barrel 146. Adjustment of the relative position between the active lens barrels 18 is performed with the driving device 16, which is positioned laterally to the stationary lens barrel 142, for focusing and zooming using the focus device 14.

The stationary lens barrel 142 of the focus device 14 is mounted on the substrate 12 toward the objective side. There is an aperture 122 set in a center of the substrate 12, allowing the optical axis of light to pass through the lens aperture 122, The gear barrel 143 is sandwiched between the stationary lens barrel 142 and the outside guide lens barrel 144, an internal edge of the surface of the gear barrel 143 is connected with the outside guide lens barrel 144, an outer edge of the surface of the gear barrel 143 includes a gear 1432 and a guide block 1434, where the gear 1432 is connected with the driving device 16, the guide block 1434 is connected with a track 1422 which is on the internal edge of the surface of the stationary lens barrel 142.

The active lens barrel 18 between the outside guide lens barrel 144 and the cam lens barrel 146, includes a first, second and third lens barrel groups 182, 184, 186. A first lens group 1822 set in the first lens barrel group 182, A second lens group 1842 set in the second lens barrel group 184, A third lens group 1862 set in the third lens barrel group 186. The first lens barrel group 182 set on an outside of the cam lens barrel 146, the second lens barrel group 184 set on an inner side of the cam lens barrel 146, the third lens barrel group 186 is received in the stationary lens barrel 142 and opposing to the aperture 122.

An internal edge of the surface of the first lens barrel group 182 and an outer edge of the surface of the second lens barrel group 184 includes a separate stationary pin (not shown). The stationary pin is connected with a track 1462 on an internal edge of the surface and an outer edge of the surface of the cam lens barrel 146. The outer edge of the surface of the cam lens barrel 146 includes a stationary pin 1464, the stationary pin 1464 passes through a track 1422 on the body of the outside guide lens barrel 144 and connects with the gear barrel 143. The track 1422 of the stationary lens barrel 142 and the track 1462 of the cam lens barrel 146 defines a groove. The track 1442 of the outside guide lens barrel 144 defines a through hole.

The first inner guide lens barrel 145 is sandwiched between the first lens barrel group 182 and the outside guide lens barrel 144, the second inner guide lens barrel 147 is sandwiched between the second lens barrel group 184 and the cam lens barrel 146. Both of the first inner guide lens barrel 145 and the second inner guide lens barrel 147 connected to the cam lens barrel 146 and following the rotation of the cam lens barrel 146. The first inner guide lens barrel 145 simultaneously connected to the first lens barrel group 182, and the second inner guide lens barrel 147 connected to the second lens barrel group 184.

Adjusting the zoom ratio of the adjustment structure 10, is by using the driving device 16 to drive the gear barrel 143, the gear barrel 143 generates a rotation operation driven by the driving device 16. The track 1422 of the stationary lens barrel 142 limits the movement of the gear barrel 143 along the optical axis of the cameras (hereinafter z-axis). The outside guide lens barrel 144 extends outside (objective side) from the stationary lens barrel 142 and moves along the z-axis following the motion of the gear barrel 143, as shown in FIG. 2.

The cam lens barrel 146 which is set at the inner side of the outside guide lens barrel 144, and following a rotation of the gear barrel 143 and is limited to move along the z-axis by the track 1442, the outside guide lens barrel 144 is connected with gear barrel 143 by stationary pin 1464. The cam lens barrel 146 moves along the z-axis, extending the cam lens barrel 146 further toward the objective side. A rotation of the first inner guide lens barrel 145 and the second inner guide lens barrel 147 is driven by the rotation of the cam lens barrel 146. The rotation of the first inner guide lens barrel 145 can drive the connected first lens barrel group 182, the rotation of the second inner guide lens barrel 147 can drive the connected second lens barrel group 184. A rotation of the first lens barrel group 182 and the second lens barrel group 184 follows the track 1462 on the internal edge of the surface; the outer edge of the surface of the cam lens barrel 146 will generate the relative z-axis position. Therefore, the distance between the first lens group 1822 and the second lens group 1842 can be adjusted to achieve the zooming function of the lens.

Figure 2:
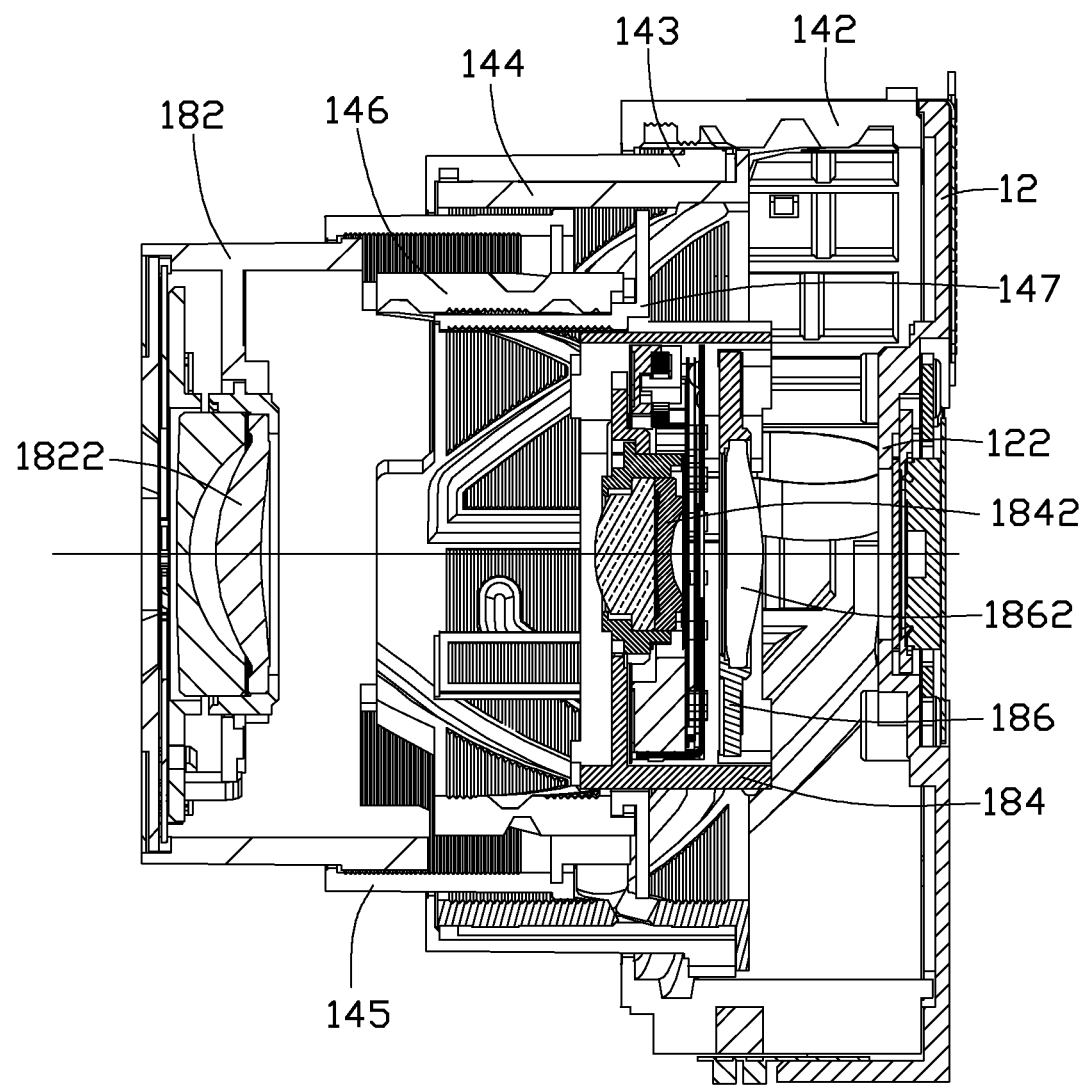
FIG. 2 is a schematic cross section view of a zoom lens adjustment structure in the minimum focal length position shown in FIG. 1.
Figure 3:
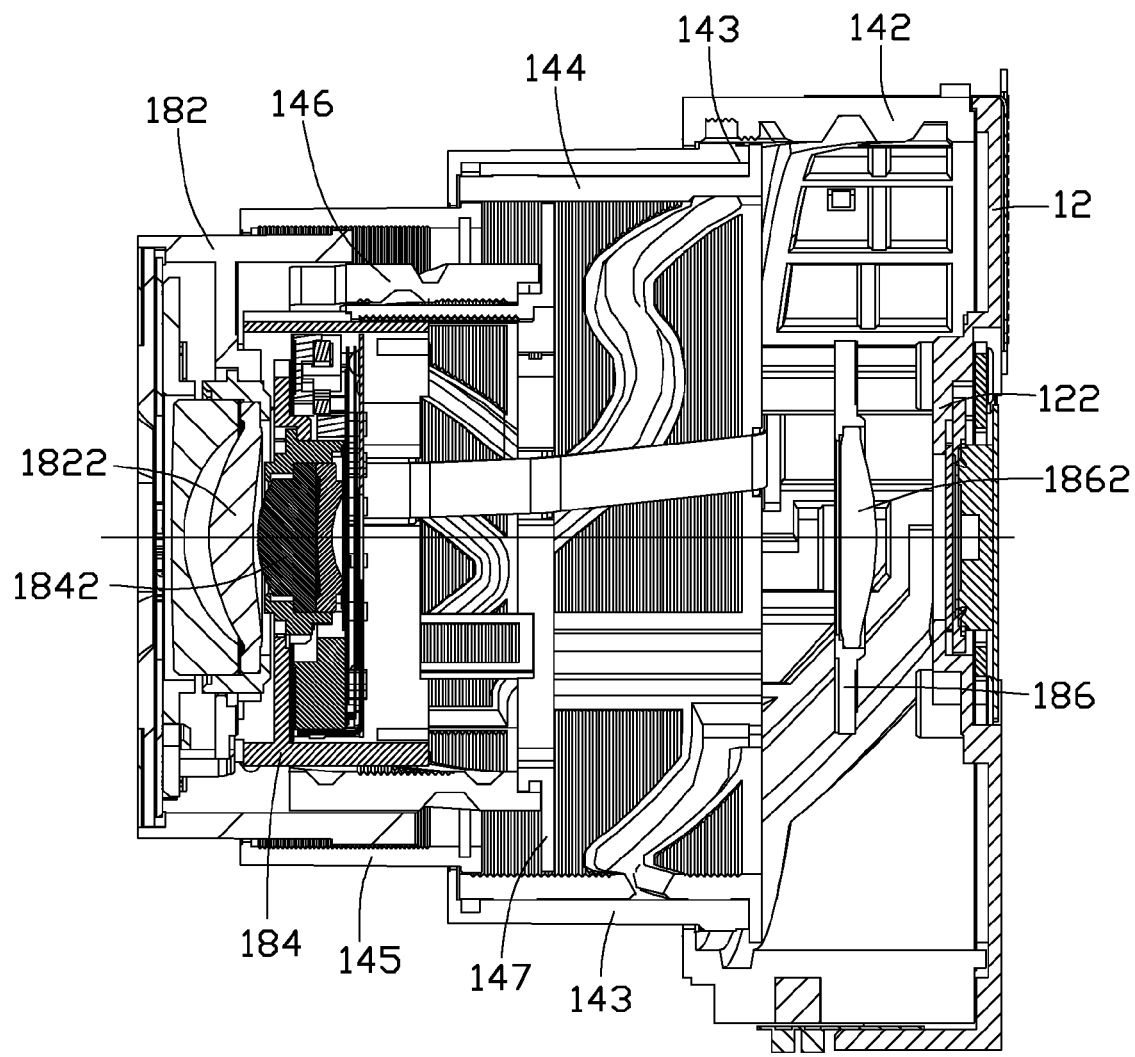
FIG. 3 is a schematic cross section view of a zoom lens adjustment structure in the maximum focal length position shown in FIG. 1.

FIG. 2 shows that the first lens group 1822 along with the first lens barrel group 182 in the end position of the cam lens barrel 146 faces the objective side, the second lens group 1842 along with the second lens barrel group 184 in the end position of the cam lens barrel 146 faces the image side. When the distance between the first lens group 1822 and the second lens group 1842 has been extended to maximize, the lens can provide close range shooting. Visa versa, when the distance between the first lens group 1822 and the second lens group 1842 is adjusted to the minimum distance through the track 1462 of the cam lens barrel 146, the lens can provide long range shooting, as shown in FIG. 3.

The adjustment of the cam lens barrel 146 of the distance between the first lens group 1822 and the second lens group 1842, since the cam lens barrel 146 is extending toward the object side at the outside guide lens barrel 144, the outside guide lens barrel 144 increasing the adjustable space. Therefore, the same lens thickness can increase the zoom ratio of the lens. The distance between first lens group 1822 and the second lens group 1842 after adjust the zooming and positioned, further needs to be refocused to obtain clear images.

The adjustment structure 10 having a focusing adjustment function, which is adjusted under driving force of the driving device 16 adjusting the position of the third lens barrel group 186 for focusing after zooming. The position adjustment of the third lens group 1862 inside the third lens barrel group 186 relative to the position after zooming of the first lens group 1822 and the second lens group 1842, is able to make the images clear after zooming.

Figure 4:
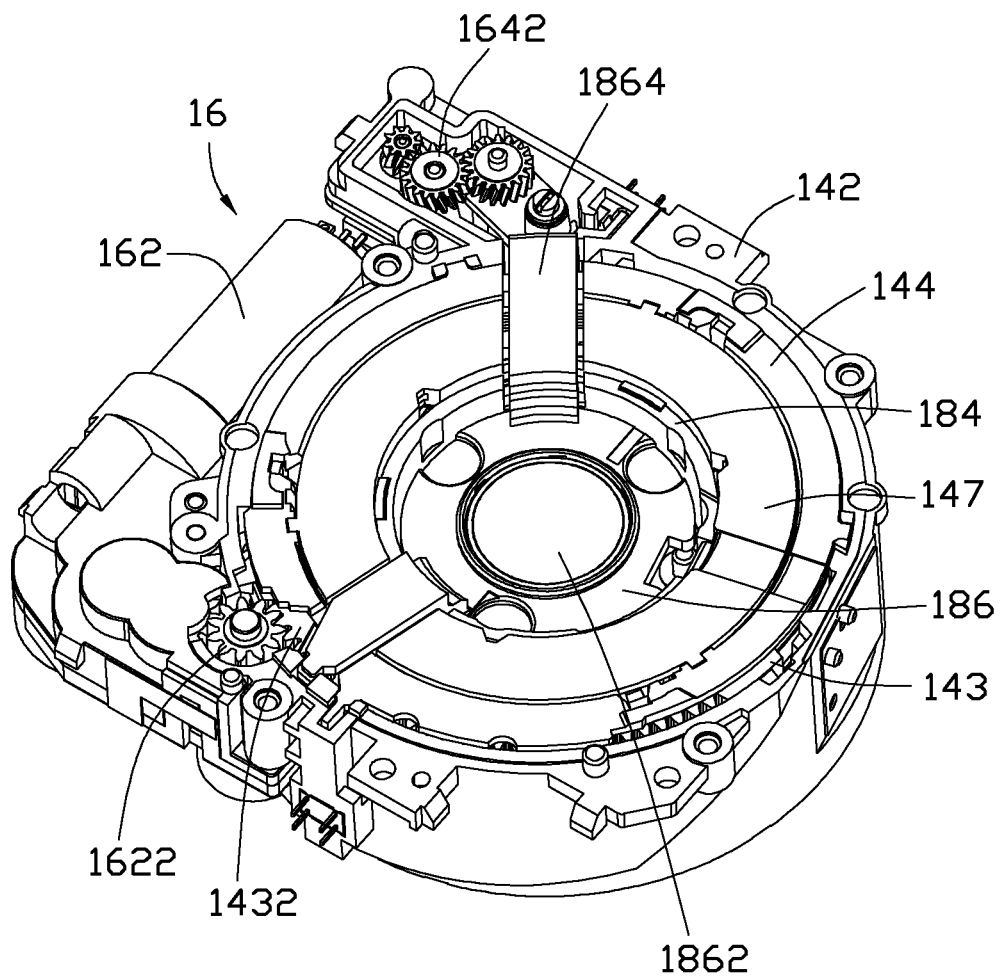
FIG. 4 is a back view of the stationary lens barrel of FIG. 1.

The driving device 16 includes a first motor 162, a first gear group 1622, a second motor 164 and a second gear group 1642. The first motor 162 is connected with the first gear group 1622, and the first gear group 1622 is further connected with the gear barrel 143, as shown in FIG. 4. The gear barrel 143 can be driven to rotate by the first motor 162 then drive the cam lens barrel 146 to adjust the zoom of the lens. The first motor 162 is a direct current (DC) motor, the first gear group 1622 is a reduction gear unit, the first motor 162 and the first gear group 1622 is positioned lateral to the stationary lens barrel 142. The rotational power of the first motor 162 passing through the first gear group 1622, will be decelerated, then the deceleration rotational power drives the gear barrel 143.

Figure 5:
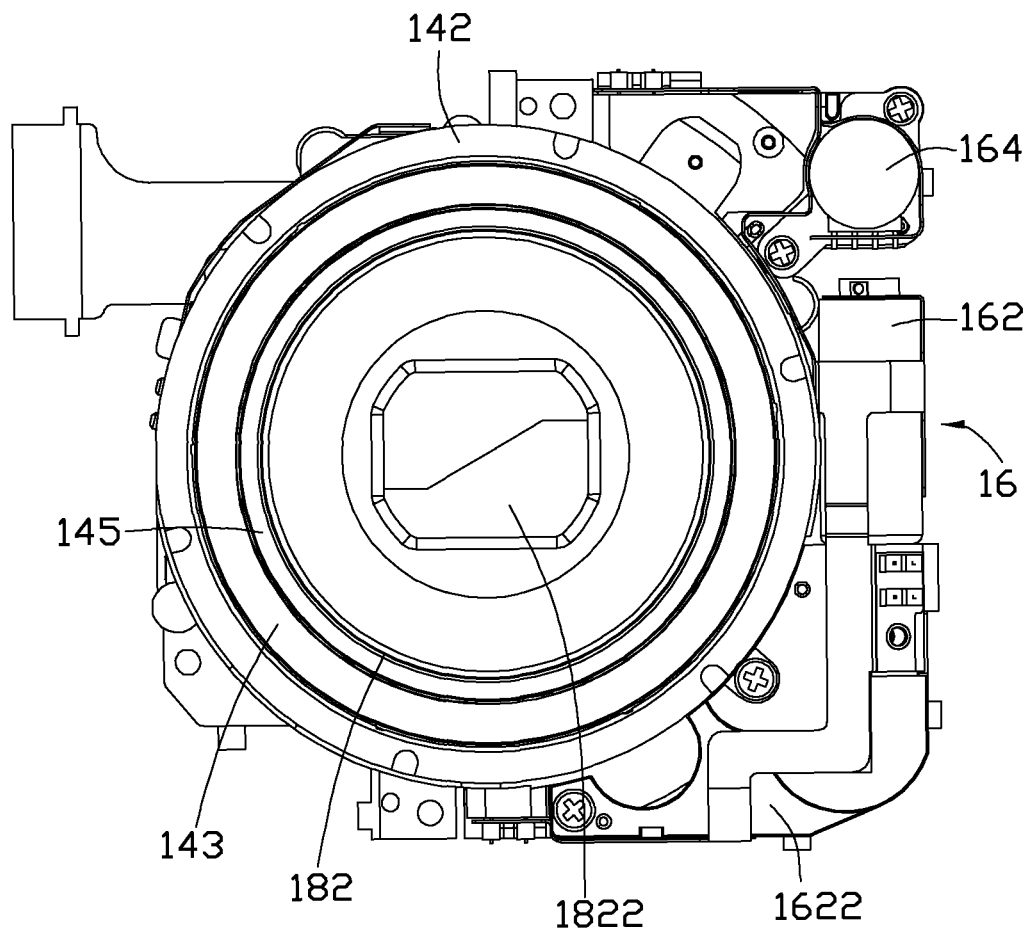
FIG. 5 is a front view of the stationary lens barrel of FIG. 1.

The second motor 164 is connected with the second gear group 1642, through a screw bracket 1864 connected with the third lens barrel group 186, making the third lens barrel group 186 move along the z-axis further to carry out the focusing adjustment. The second motor 164 is a step motor, the second gear group 1642 is a reduction gear unit, the second motor 164 and the second gear group 1642 is positioned at the opposite lateral to the stationary lens barrel 142, as shown in FIG. 4 and FIG. 5. The rotational power of the second motor 164 passing through the second gear group 1642 decelerates, then the decelerated rotational power drives the screw bracket 1864 to move along the z-axis, therefore, the third lens barrel group 186 following the screw bracket 1864 moving along the z-axis, making the third lens group 1862 carry out the focusing operation after zooming.

The present disclosure of a zoom lens adjustment structure, the gear barrel 143 and the outside guide lens barrel 144 during the zooming adjustment operation, extend from the stationary lens barrel 142 to the objective side, making the gear barrel 143 drive the cam lens barrel 146, and carry out the zooming adjustment operation of the first lens group 1822 and the second lens group 1842, allowing maximum adjustment space and further increase the adjustment zoom ratio. Simultaneously, the gear barrel 143 and the outside guide lens barrel 144 may be fully retracted in the stationary lens barrel 142. Therefore, increase the zoom ratio of the lens using the same lens thickness. The driving device 16 can also to drive the third lens group 1862 for focusing after completing the zooming operation, assuring good image quality.

Although the present disclosure has been specifically described on the basis of this exemplary embodiment, the disclosure is not to be construed as being limited thereto. Various changes or modifications may be made to the embodiment without departing from the scope and spirit of the disclosure.

What is claimed is:

1. A zoom lens adjustment structure, comprising:
   a substrate;
   a focus device mounted on the substrate, comprising:
      a stationary lens barrel mounted on the substrate toward an objective side;
      an outside guide lens barrel received in the stationary lens barrel;
   a cam lens barrel set at the inner side of the outside guide lens barrel;
   a plurality of active lens barrels sandwiched between the outside guide lens barrel and the cam lens barrel, wherein the active lens barrels comprises a first lens barrel group, a second lens barrel group, a third lens barrel group, a first lens group set in the first lens barrel group, a second lens group set in the second lens barrel group, and a third lens group set in the third lens barrel group;
   a first inner guide lens barrel sandwiched between the outside guide lens barrel and the cam lens barrel, the first lens barrel group sandwiched between the cam lens barrel and the first inner guide lens barrel, the second lens barrel group set on an inner side of the cam lens barrel, the third lens barrel group received in the stationary lens barrel and opposing the aperture of the substrate;
   a second inner guide lens barrel sandwiched between the second lens barrel group and the cam lens barrel, both the first inner guide lens barrel and the second inner guide lens barrel connected to the cam lens barrel, the first inner guide lens barrel simultaneously connected to the first lens barrel group, and the second inner guide lens barrel connected to the second lens barrel group;
   a gear barrel sandwiched between the stationary lens barrel and the outside guide lens barrel, an internal surface of the gear barrel connected with the outside guide lens barrel, and
   a driving device positioned lateral to the stationary lens barrel, to drive the focus device to adjust position of the movable lens barrels, the driving device comprising a motor and a gear group, an outer surface of the gear barrel connected with the gear group, the gear group configured for driving the gear barrel to rotate, the gear barrel being able to drive the cam lens barrel to rotate wherein a rotation of the cam lens barrel drives the first inner guide lens barrel and the second inner guide lens barrel to rotate, a rotation of the first inner guide lens barrel drives the connected first lens barrel group, and a rotation of the second inner guide lens barrel drives the connected second lens barrel group.

2. The zoom lens adjustment structure as claim 1, wherein the stationary lens barrel comprising an aperture set in a center of the substrate.

3. The zoom lens adjustment structure as claim 1, wherein the stationary lens barrel, the outside guide lens barrel and the cam lens barrel each comprises a track, the track of the stationary lens barrel is set on an internal surface of the stationary lens barrel, the track of the outside guide lens barrel is set on the body, the track of the cam lens barrel is set on an internal surface and an outer surface of the cam lens barrel.

4. The zoom lens adjustment structure as claim 3, wherein the track of the stationary lens barrel and the cam lens barrel defines a groove, the track of the outside guide lens barrel defines a through hole.

5. The zoom lens adjustment structure as claim 1, wherein an internal surface of the first lens barrel group and an outer surface of the second lens barrel group comprising a separate stationary pin, and the stationary pin is connected with the track on the internal surface and the outer surface of the cam lens barrel.

6. The zoom lens adjustment structure as claim 1, wherein the outer surface of the cam lens barrel comprising a stationary pin, the stationary pin passes through a track on the body of the outside guide lens barrel and connects with the gear barrel.

7. The zoom lens adjustment structure as claim 1, wherein the driving device comprising a first motor, a first gear group, a second motor and a second gear group.

8. The zoom lens adjustment structure as claim 7, wherein the first motor is connected with the first gear group, and the first gear group is further connected with the gear barrel.

9. The zoom lens adjustment structure as claim 7, wherein the first motor is a direct current motor, the first gear group is a reduction gear unit, the first motor and the first gear group is positioned lateral to the stationary lens barrel.

10. The zoom lens adjustment structure as claim 7, wherein the second motor is connected with the second gear group, the second gear group through a screw bracket connected with the third lens barrel group.

11. The zoom lens adjustment structure as claim 7, wherein the second motor is a step motor, the second gear group is a reduction gear unit, the second motor and the second gear group is positioned at the opposite lateral to the stationary lens barrel.

* * * * *